(12) United States Patent
Li et al.

(10) Patent No.: US 11,304,097 B2
(45) Date of Patent: Apr. 12, 2022

(54) BANDWIDTH INDICATION METHOD AND APPARATUS

(71) Applicant: HUAWEI TECHNOLOGIES CO., LTD., Guangdong (CN)

(72) Inventors: Xinxian Li, Shanghai (CN); Hao Tang, Shanghai (CN); Zhenfei Tang, Ottawa (CA); Fan Wang, Shanghair (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 35 days.

(21) Appl. No.: 16/673,339

(22) Filed: Nov. 4, 2019

(65) Prior Publication Data

US 2020/0068444 A1  Feb. 27, 2020

Related U.S. Application Data

(63) Continuation of application No. PCT/CN2018/085501, filed on May 3, 2018.

(30) Foreign Application Priority Data

May 5, 2017  (CN) .......................... 201710314156.0

(51) Int. Cl.
*H04W 28/20* (2009.01)
*H04W 72/04* (2009.01)

(52) U.S. Cl.
CPC ....... *H04W 28/20* (2013.01); *H04W 72/0453* (2013.01)

(58) Field of Classification Search
CPC ............. H04W 28/20; H04W 72/0453; H04W 72/042; H04L 5/001
See application file for complete search history.

(56) References Cited

U.S. PATENT DOCUMENTS

2012/0275428 A1* 11/2012 Feng ..................... H04L 5/0064
  370/330
2014/0003449 A1  1/2014 Li
(Continued)

FOREIGN PATENT DOCUMENTS

CN  102118218 A  7/2011
CN  103516625 A  1/2014
(Continued)

OTHER PUBLICATIONS

3GPP TSG RAN WG1 Meeting #86,R1-167353,:"Initial views on the paging on non-anchor PRB for Rel-14 NB-IoT", NTT DOCOMO, Gothenburg, Sweden 22"d-261h Aug. 2016, total 3 pages.
(Continued)

*Primary Examiner* — Jackie Zuniga Abad
(74) *Attorney, Agent, or Firm* — Womble Bond Dickinson (US) LLP (57) ABSTRACT

This application relates to the field of communications technologies, and discloses a bandwidth indication method and apparatus, to provide a solution of indicating, by a base station, an allocated bandwidth part to a terminal when the terminal does not know a carrier bandwidth. The method is: determining, by the base station, a virtual bandwidth allocated to the terminal, where the virtual bandwidth is a part of a carrier bandwidth, and a bandwidth allocated to the terminal falls within the virtual bandwidth; and sending, by the base station, position information of the virtual bandwidth to the terminal, where the position information is used to indicate a position of the virtual bandwidth.

14 Claims, 6 Drawing Sheets

(56) References Cited

U.S. PATENT DOCUMENTS

2015/0341911 A1* 11/2015 Wakabayashi .... H04W 72/0453
370/329
2016/0014778 A1* 1/2016 Zhou .................... H04L 5/0094
370/252

FOREIGN PATENT DOCUMENTS

| CN | 104144449 A | 11/2014 |
| CN | 104685923 A | 6/2015 |
| EP | 2916602 A1 | 9/2015 |

OTHER PUBLICATIONS

3GPP TSGRAN WGI Meeting #88bis,R1-1705069,:'Resource allocation and indication for data channel', Huawei, HiSilicon, Spokane, USA,3rd-7lh Apr. 2017, total 8 pages.

* cited by examiner

| | |
|---|---|
| 1 | Sub-BP 9 |
| 1 | Sub-BP 8 |
| 0 | Sub-BP 7 |
| 1 | Sub-BP 6 |
| 1 Synchronization signal block | Sub-BP 5 |
| 0 | Sub-BP 4 |
| 1 | Sub-BP 3 |
| 1 | Sub-BP 2 |
| 1 | Sub-BP 1 |
| 1 | Sub-BP 0 |

FIG. 3

| | |
|---|---|
| 1 | Sub-BP 9 |
| 1 | Sub-BP 8 |
| 0 | Sub-BP 7 |
| 1 | Sub-BP 6 |
| 1 | Sub-BP 5 |
| 0 | Sub-BP 4 |
| 1 | Sub-BP 3 |
| 1 | Sub-BP 2 |
| 1 | Sub-BP 1 |
| 1 | Sub-BP 0 |
| Offset | |
| Synchronization signal block | |

FIG. 4

| | |
|---|---|
| 0 | Sub-BP m+5 |
| 2 | |
| 1 | Sub-BP m+4 |
| 0 | |
| 2 | |
| 1 | Sub-BP m+3 |
| 0 | |
| 2 | |
| 1 | Sub-BP m+2 |
| 0 | |
| 2 | |
| 1 | Sub-BP m+1 |
| 0 | |
| 2 | |
| 1 | Sub-BP m |
| 0 | |

BANDWIDTH INDICATION METHOD AND APPARATUS

CROSS-REFERENCE TO RELATED APPLICATIONS

This application is a continuation of International Application No. PCT/CN2018/085501, filed on May 3, 2018, which claims priority to Chinese Patent Application No. 201710314156.0, filed on May 5, 2017. The disclosures of the aforementioned applications are hereby incorporated by reference in their entireties.

TECHNICAL FIELD

Embodiments of this application relate to the field of communications technologies, and in particular, to a bandwidth indication method and apparatus.

BACKGROUND

A bandwidth capability of a terminal refers to a maximum bandwidth size that can be supported by the terminal. For a given terminal, a bandwidth capability of the terminal is fixed. When a carrier bandwidth is greater than the maximum bandwidth size that can be supported by the terminal, a base station needs to allocate, to the terminal, a segment of bandwidth that is less than or equal to the bandwidth capability of the terminal for the terminal to use. The segment of bandwidth allocated by the base station may be referred to as a bandwidth part (BP). The terminal transmits physical channel information and physical signal information within the BP allocated by the base station.

In one embodiment, the terminal may know a size of the carrier bandwidth, or may not know a size of the carrier bandwidth. For example, in long term evolution (LTE), the base station broadcasts the carrier bandwidth in a master information block (MIB), all terminals in a cell can learn of the carrier bandwidth. The base station numbers the carrier bandwidth by using a subcarrier spacing. The subcarrier spacing is known to both the base station and the terminals. The base station selects a segment of contiguous or noncontiguous physical resource blocks (PRB) as a BP of one terminal, and indicates the BP of the terminal by indicating the segment of contiguous or noncontiguous physical resources.

However, in some application scenarios, the terminal does not need to know the carrier bandwidth. When the terminal does not know the carrier bandwidth, how the base station indicates the allocated BP to the terminal is an urgent problem that needs to be resolved.

SUMMARY

Embodiments of this application provide a bandwidth indication method and apparatus, to provide a solution of indicating, by a base station, an allocated BP to a terminal when the terminal does not know a carrier bandwidth.

The specific technical solutions provided in the embodiments of this application are as follows.

According to a first aspect, a bandwidth indication method is provided. The method includes: determining, by a base station, a virtual bandwidth allocated to a terminal, and sending position information of the virtual bandwidth to the terminal, where the virtual bandwidth is a part of a carrier bandwidth, a bandwidth allocated to the terminal falls within the virtual bandwidth, and the position information is used to indicate a position of the virtual bandwidth. In this way, for a scenario in which the terminal does not know a size of the carrier bandwidth, bandwidth indication can be implemented.

In one embodiment, the position information includes a relative position of the virtual bandwidth relative to a reference frequency domain position. In this way, the terminal can obtain an actual frequency domain position of the virtual bandwidth based on a baseline frequency domain position and the relative position.

In one embodiment, the base station sends a size of the virtual bandwidth.

In one embodiment, the base station sends the size of the virtual bandwidth in the following manner: sending, by the base station, a first message, where the first message includes a bandwidth set, and the bandwidth set includes at least one bandwidth, or the bandwidth set is predefined; and sending, by the base station, a second message, where the second message is used to indicate that one bandwidth in the bandwidth set is the size of the virtual bandwidth. In one embodiment, the base station may alternatively send a third message, and the third message is used to indicate the size of the virtual bandwidth.

In one embodiment, a size of the virtual bandwidth is predefined; and there is a correspondence between a carrier frequency and a bandwidth, and the base station determines, based on the correspondence, that a bandwidth corresponding to a used carrier frequency is the size of the virtual bandwidth.

In one embodiment, the relative position may be a first offset value between the reference frequency domain position and a lowest frequency domain position of the virtual bandwidth; or a second offset value between the reference frequency domain position and a highest frequency domain position of the virtual bandwidth; or a third offset value between the reference frequency domain position and a specified frequency domain position of the virtual bandwidth.

In one embodiment, the method further includes: sending, by the base station, resource indication information, where the resource indication information is used to indicate a frequency domain position of a sub-bandwidth occupied by the terminal in the virtual bandwidth; or the resource indication information is used to indicate a frequency domain position of a sub-bandwidth group occupied by the terminal in the virtual bandwidth, the sub-bandwidth group includes n sub-bandwidths, n≥2, and n is a positive integer. In this way, a BP allocated to the terminal may be notified based on the position of the virtual bandwidth and the indication of the resource indication information.

In one embodiment, n is predefined, or n is notified by the base station to the terminal, or n is determined based on a maximum bandwidth supported by the terminal.

In one embodiment, the virtual bandwidth may be a cell level, to be specific, the virtual bandwidth may be a bandwidth allocated by the base station to each terminal in a cell; or the virtual bandwidth may alternatively be a terminal level, to be specific, the virtual bandwidth may be a bandwidth allocated by the base station to a specified terminal.

In one embodiment, the base station indicates size information of a frequency domain bandwidth included in a sub-bandwidth at a boundary position of the virtual bandwidth.

In one embodiment, the reference frequency domain position is a synchronization signal block frequency domain position, or a public bandwidth frequency domain position, or a direct current carrier frequency domain position.

According to a second aspect, a bandwidth indication method is provided. The method includes: receiving, by a terminal, position information of a virtual bandwidth, and determining a position of the virtual bandwidth based on the position information, where the virtual bandwidth is a part of a carrier bandwidth, a bandwidth allocated by a base station to the terminal falls within the virtual bandwidth, and the position information is used to indicate the position of the virtual bandwidth. In this way, for a scenario in which the terminal does not know a size of the carrier bandwidth, the bandwidth indication can be implemented.

In one embodiment, the position information includes a relative position of the virtual bandwidth relative to a reference frequency domain position. In this way, the terminal can obtain an actual frequency domain position of the virtual bandwidth based on a baseline frequency domain position and the relative position.

In one embodiment, the terminal receives a size of the virtual bandwidth.

In one embodiment, the terminal receives the size of the virtual bandwidth in the following manner: receiving, by the terminal, a first message, where the first message includes a bandwidth set, and the bandwidth set includes at least one bandwidth, or the bandwidth set is predefined; and receiving, by the terminal, a second message, where the second message is used to indicate that one bandwidth in the bandwidth set is the size of the virtual bandwidth. In one embodiment, the terminal may alternatively receive a third message, and the third message is used to indicate the size of the virtual bandwidth.

In one embodiment, a size of the virtual bandwidth is predefined; and there is a correspondence between a carrier frequency and a bandwidth, and the terminal determines, based on the correspondence, that a bandwidth corresponding to a used carrier frequency is the size of the virtual bandwidth.

In one embodiment, the relative position may be a first offset value between the reference frequency domain position and a lowest frequency domain position of the virtual bandwidth; or a second offset value between the reference frequency domain position and a highest frequency domain position of the virtual bandwidth; or a third offset value between the reference frequency domain position and a specified frequency domain position of the virtual bandwidth.

In one embodiment, the method further includes: receiving, by the terminal, resource indication information, determining, by the terminal according to the resource indication information, a frequency domain position of a sub-bandwidth occupied by the terminal in the virtual bandwidth; or determining, by the terminal according to the resource indication information, a frequency domain position of a sub-bandwidth group occupied by the terminal in the virtual bandwidth, where the sub-bandwidth group includes n sub-bandwidths, n≥2, and n is a positive integer. In this way, the terminal may learn, based on the position of the virtual bandwidth and the indication of the resource indication information, of a BP allocated by the base station to the terminal within the virtual bandwidth.

In one embodiment, n is predefined, or n is notified by the base station to the terminal, or n is determined based on a maximum bandwidth supported by the terminal.

In one embodiment, the terminal receives size information that is sent by the base station and that is of a frequency domain bandwidth included in a sub-bandwidth at a boundary position of the virtual bandwidth.

In one embodiment, the reference frequency domain position is a synchronization signal block frequency domain position, or a public bandwidth frequency domain position, or a direct current carrier frequency domain position.

According to a third aspect, a bandwidth indication apparatus is provided. The apparatus has a function for implementing a behavior of the base station according to any one of the first aspect and the embodiments of the first aspect. The function may be implemented by using hardware, or may be implemented by hardware executing corresponding software. The hardware or software includes one or more modules corresponding to the foregoing function.

According to a fourth aspect, a bandwidth indication apparatus is provided. The apparatus has a function for implementing a behavior of the base station according to any one of the second aspect and the embodiments of the second aspect. The function may be implemented by using hardware, or may be implemented by hardware executing corresponding software. The hardware or software includes one or more modules corresponding to the foregoing function.

According to a fifth aspect, a bandwidth indication apparatus is provided. A structure of the bandwidth indication apparatus includes a transceiver, a memory, a processor, and a bus. The memory is configured to store a set of programs. The processor is configured to invoke the programs stored in the memory, to perform the method according to any one of the first aspect and the embodiments of the first aspect.

According to a sixth aspect, a bandwidth indication apparatus is provided. A structure of the bandwidth indication apparatus includes a transceiver, a memory, a processor, and a bus. The memory is configured to store a set of programs. The processor is configured to invoke the programs stored in the memory, to perform the method according to any one of the second aspect and the embodiments of the second aspect.

According to a seventh aspect, a communications system is provided. The system includes the apparatus according to the third aspect or the fifth aspect and the apparatus according to the fourth aspect or the sixth aspect.

According to an eighth aspect, a computer storage medium is provided. The computer storage medium is configured to store a computer program. The computer program includes an instruction used to perform the method according to any one of the first aspect and the possible embodiments of the first aspect, or any one of the second aspect and the possible embodiments of the second aspect.

According to a ninth aspect, an embodiment of this application provides a computer program product including an instruction. When the computer program product is run on a computer, the computer is enabled to perform the method according to the foregoing aspects.

DESCRIPTION OF EMBODIMENTS

The following describes in detail the embodiments of this application with reference to accompanying drawings.

For a scenario in which a terminal does not know a size of a carrier bandwidth, the embodiments of this application provide a bandwidth indication method and apparatus. A virtual bandwidth is pre-divided, and a frequency domain position that the terminal easily obtains is used as a baseline point. The baseline point may also be referred to as a baseline frequency domain position or a specified frequency domain position. A base station notifies the terminal of a relative position between the baseline point and the virtual bandwidth. In this way, the terminal may obtain an actual frequency domain position of the virtual bandwidth based on a position of the baseline point and the relative position, thereby implementing bandwidth indication.

Figure 1:
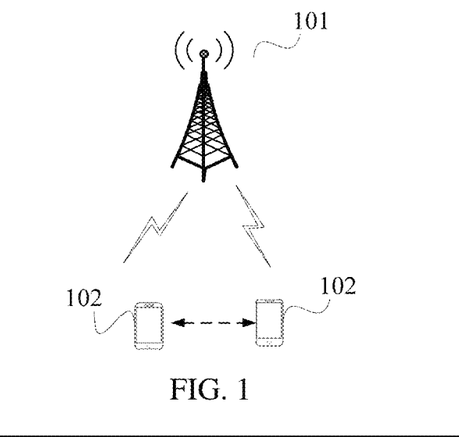
FIG. 1 is a schematic architectural diagram of a communications system according to an embodiment of this application.

As shown in FIG. 1, a communications system to which an embodiment of this application is applied includes a base station 101 and terminals 102. The base station 101 is an apparatus that is deployed in a radio access network and that is configured to provide a wireless communication function to the terminals 102. The base station 101 may include macro base stations, micro base stations, relay stations, access points, and the like in various forms, may be applied to systems of different radio access technologies, for example, to more possible communications systems such as a LTE system or a 5th generation (5G) communications system. The base station 101 may further be another network device having a base station function, and particularly, may further be a terminal that serves as the base station function in D2D communication. The terminal 102 may include various handheld devices, in-vehicle devices, wearable devices, computing devices that have a wireless communication function or other processing devices connected to a wireless modem, and user equipment (UE), mobile stations (MS), and the like in various forms.

In the embodiments of this application, the concept of carrier bandwidth is equivalent to a system bandwidth. A bandwidth allocated by the base station to the terminal may be referred to as a BP. The terminal transmits physical channel information or physical signal information by using the BP allocated by the base station. The physical channel information includes physical uplink and downlink control channel information and physical uplink and downlink shared channel information. For convenience of description, a definition of a virtual bandwidth mentioned in the embodiments of this application is first explained. The embodiments of this application provide a virtual bandwidth, to help a base station allocate a BP to a terminal. The virtual bandwidth is a segment of contiguous bandwidths divided from the carrier bandwidth. The virtual bandwidth is less than or equal to the carrier bandwidth. A position of the virtual bandwidth in frequency domain can be variable. To be specific, for different terminals, positions of the virtual bandwidth in the frequency domain may be different. A size of the virtual bandwidth is a bandwidth occupied by the virtual bandwidth on the carrier bandwidth. The virtual bandwidth may be a public level or a user group. To be specific, for all terminals in a cell or a user group, sizes of virtual bandwidths are the same. The virtual bandwidth may alternatively be a terminal level. To be specific, sizes of virtual bandwidths of different terminals in a cell may be different.

A reference frequency domain position described in the embodiments of this application may also be referred to as a specified frequency domain position. The specified frequency domain position is a frequency domain position fixed in the carrier bandwidth and can be learned of by a terminal. For example, the reference frequency domain position may be a synchronization signal block frequency domain position, or a public bandwidth frequency domain position, or a direct current carrier frequency domain position. In this way, a baseline point at which the base station allocates a bandwidth is determined, a size of a virtual bandwidth is also determined, and the base station only needs to notify the terminal of a relative position between the baseline point and the virtual bandwidth.

Figure 2:
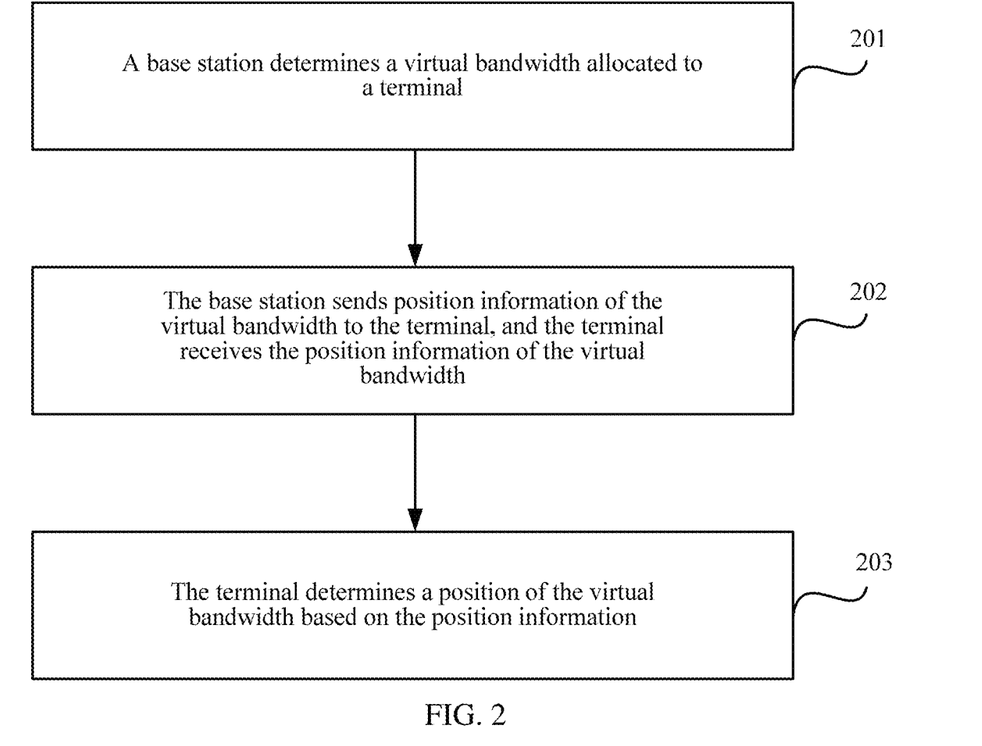
FIG. 2 is a schematic flowchart of a bandwidth indication method according to an embodiment of this application.

Based on the communications system shown in FIG. 1, as shown in FIG. 2, in an embodiment of this application, a specific procedure of a bandwidth indication method is as follows.

Operation 201: The base station determines a virtual bandwidth allocated to the terminal.

The virtual bandwidth is a part of a carrier bandwidth, and a bandwidth allocated to the terminal falls within the virtual bandwidth.

Operation 202: The base station sends position information of the virtual bandwidth to the terminal, and the terminal receives the position information of the virtual bandwidth.

The position information is used to indicate a position of the virtual bandwidth.

The position information includes a relative position of the virtual bandwidth relative to a reference frequency domain position. For example, the relative position may be an offset value.

The relative position is used by the terminal to determine a frequency domain position of the virtual bandwidth based on the reference frequency domain position and the relative position.

Operation 203: The terminal determines the position of the virtual bandwidth based on the position information.

The terminal determines a BP allocated by the base station to the terminal in the virtual bandwidth.

The following specifically describes the foregoing bandwidth indication method.

Specifically, manners of determining, by the base station, a size of the virtual bandwidth and notifying the terminal of the size of the virtual bandwidth include but are not limited to the following manners.

Manner 1. The size of the virtual bandwidth is predefined. To be specific, the size of the virtual bandwidth does not need to be notified by the base station.

A correspondence between the carrier frequency (or a carrier frequency range) and the size of the virtual bandwidth is preset. The base station and the terminal find, based on a used carrier frequency and the correspondence, a bandwidth corresponding to the used carrier frequency as a size of a virtual bandwidth used in a current bandwidth indication. For example, the correspondence is shown in Table 1.

TABLE 1

| | Carrier frequency (GHz) | | |
|---|---|---|---|
| | f < 6 | 6 < f < 28 | f > 28 |
| Bandwidth (MHz) | 100 | 200 | 400 |

When the carrier frequency used for the base station and the terminal is less than 6 GHz, the size of the virtual bandwidth is 100 MHz. When the carrier frequency used for the base station and the terminal is greater than 6 GHz and less than 28 GHz, the size of the virtual bandwidth is 200 MHz. When the carrier frequency used for the base station and the terminal is greater than 28 GHz, the size of the virtual bandwidth is 400 MHz.

In one embodiment, one carrier frequency or carrier frequency range corresponds to one bandwidth set. A base station side first determines the bandwidth set by using the carrier frequency, and then notifies, by using MIB signaling, or system information block (SIB) signaling, or remaining minimum system information (RMSI) signaling, the terminal of the virtual bandwidth determined by the base station.

Manner 2. The size of the virtual bandwidth is notified by using signaling.

Specifically, the base station sends a first message, the first message carries a bandwidth set, and the bandwidth set includes at least one bandwidth. Alternatively, the bandwidth set is predefined.

The base station sends a second message, and the second message carries indication information and is used to indicate that a bandwidth in the bandwidth set is the size of the virtual bandwidth.

For example, the first message is radio resource control (RRC) signaling. The base station adds the bandwidth set to the RRC signaling. An example of the bandwidth set is {50, 100, 150, 200, 400} MHz. Alternatively, a bandwidth set {50, 100, 150, 200, 400} MHz is predefined. The second message is MIB signaling, or SIB signaling, or RMSI signaling. The base station uses the MIB signaling, or the SIB signaling, or the RMSI signaling to indicate a bandwidth in the bandwidth set as the size of the virtual bandwidth. In one embodiment, in the foregoing three types of signaling, the base station uses three bits to indicate the size of the virtual bandwidth.

In one embodiment, the base station may alternatively directly indicate a specific virtual bandwidth value, such as 100 MHz, by using signaling. The base station may use, but not limited to, the following signaling: the RRC signaling, the MIB signaling, the SIB signaling, and the RMSI signaling.

In one embodiment, when the virtual bandwidth is a terminal level, the size of the virtual bandwidth that is determined by the base station needs to be determined based on a maximum bandwidth supported by the terminal. For example, the size of the virtual bandwidth that is determined by the base station may be equal to the maximum bandwidth supported by the terminal.

The size of the virtual bandwidth is determined, so that signaling overheads of resource allocation performed by the base station is a determined value. In addition, the signaling overheads of the resource allocation are further related to a resource allocation granularity in the virtual bandwidth. The resource allocation granularity refers to a minimum unit for the resource allocation, may be a segment of contiguous or noncontiguous resource units having a fixed bandwidth size, may be an integral number of resource units including PRBs, or an integral number of resource units having fixed bandwidth sizes, or the like.

According to the indication of the size of the virtual bandwidth, the terminal may learn of the size of the virtual bandwidth on which the base station allocates a resource, but the terminal does not know a specific position of the bandwidth allocated by the base station in frequency domain. The base station notifies the specific frequency domain position of the allocated bandwidth by using the relative position between the baseline frequency domain position and the virtual bandwidth.

In a possible embodiment, the relative position may be a frequency domain offset value. Specifically, the relative position may be a first offset value between the reference frequency domain position and a lowest frequency domain position of the virtual bandwidth; or a second offset value between the reference frequency domain position and a highest frequency domain position of the virtual bandwidth; or a third offset value between the reference frequency domain position and a specified frequency domain position of the virtual bandwidth. The specified frequency domain position of the virtual bandwidth may be a specified reference frequency domain position in the virtual bandwidth, for example, a minimum resource allocation unit numbered m in the virtual bandwidth, where m≥0, and m is an integer.

The resource allocation granularity in the virtual bandwidth refers to a minimum unit for bandwidth allocation. For example, a PRB is a granularity, and a resource block group (RBG) is also a granularity. To reduce the signaling overheads of the resource allocation, this embodiment of this application provides a resource allocation granularity of a sub-bandwidth. The concept of sub-bandwidth in this embodiment of this application is equivalent to the concept of sub-BP. In the following description, the concept of sub-BP is used for description. The virtual bandwidth is divided into N contiguous sub-BPs, and N is a positive integer. The BP includes a segment of contiguous PRBs, or the sub-BP is a resource block unit having a fixed bandwidth in frequency domain, or the sub-BP includes a segment of contiguous resource units having a fixed bandwidth. In this embodiment of this application, a size of the sub-BP refers to a bandwidth occupied by a size of the sub-BP in frequency domain.

The base station further needs to send the size of the sub-BP and/or the quantity of the sub-BPs to the terminal.

The sub-BPs are used by the base station to better indicate specified positions occupied by the terminal in the virtual bandwidth. The base station further needs to send resource indication information to the terminal. The resource indication information is used to indicate a specific frequency domain position of the occupied sub-BP in the BP allocated to the terminal in the virtual bandwidth terminal. To reduce the signaling overheads, the base station may further use the resource indication information to indicate a specific frequency domain position of an occupied sub-BP group in the BP allocated to the terminal in the virtual bandwidth. The sub-BP group includes n sub-BPs, where n≥2, and n is a positive integer. A value of n may be predefined. To be specific, quantities of sub-BPs included in sub-BP groups of all terminals in a cell are the same. Alternatively, a value of n is notified by the base station to the terminal, for example, by using the MIB signaling, or the SIB signaling, or the RMSI, or the RRC signaling. Alternatively, a value of n is related to a bandwidth capability of the terminal. For different terminals, the value of n is bound to the maximum bandwidth supported by the terminal or a bandwidth reported by the terminal. For example, the maximum bandwidth supported by the terminal is 100 MHz, the value of n is 2, and the sub-BP group includes two sub-BPs. For another example, the maximum bandwidth supported by the terminal is 200 MHz, the value of n is 4, and the sub-BP group includes four sub-BPs. For another example, the terminal reports that a bandwidth value expected by the terminal is 100 MHz, the value of n is 2, and the sub-BP group includes two sub-BPs.

It may be learned from the foregoing description that the base station notifies the terminal of the size of the virtual bandwidth and the size of the sub-BP in the virtual bandwidth. The base station further needs to notify the terminal of the specific positions of the occupied sub-BP in the virtual bandwidth.

Figure 3:
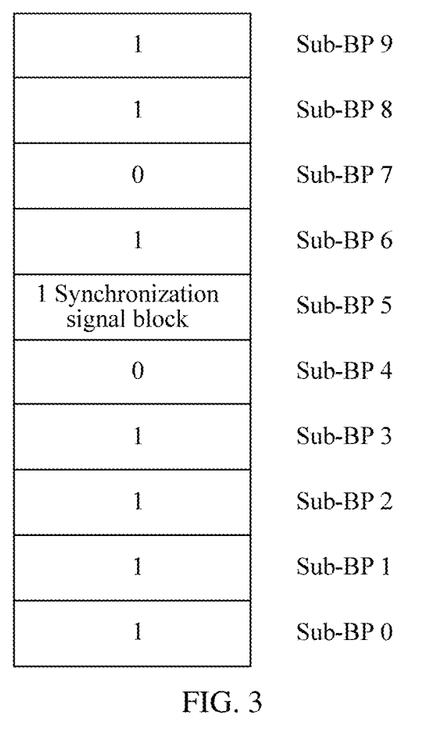
FIG. 3 is a first schematic diagram of a resource allocation manner according to an embodiment of this application.
Figure 4:
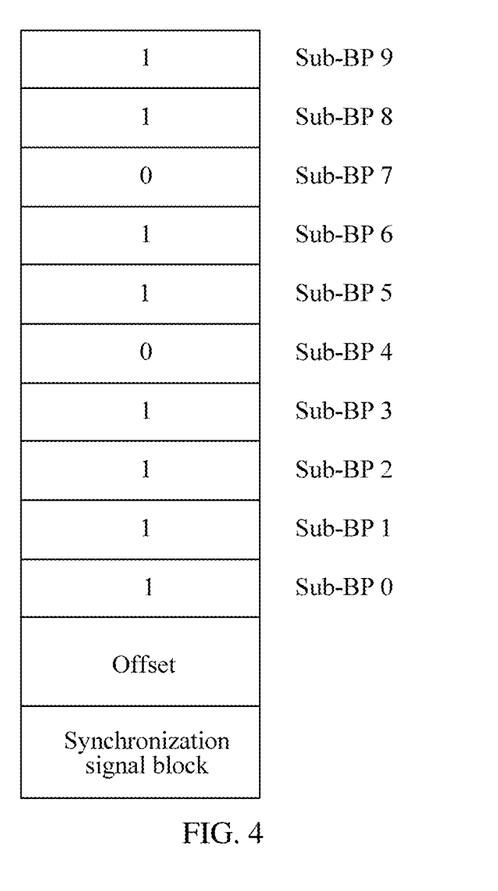
FIG. 4 is a second schematic diagram of a resource allocation manner according to an embodiment of this application.

In a possible embodiment, as shown in FIG. 3 or FIG. 4, the base station notifies the terminal of the specific position of the occupied sub-BP in the virtual bandwidth in a resource allocation manner 0 (namely, a bitmap) in existing LTE. For example, the base station divides the virtual bandwidth into a fixed quantity of sub-BPs based on the size of the sub-BP, for example, into ten sub-BPs, namely, a sub-BP 0, a sub-BP 1, . . . and a sub-BP 9. A value of the bitmap indicates whether a corresponding sub-BP is occupied by a resource allocated to the terminal. For example, values of the bitmap include 1 and 0. The value of the bitmap being 1 indicates that the corresponding sub-BP is occupied by the resource allocated to the terminal. That the reference frequency domain position is a synchronization signal block frequency domain position is used as an example. The base station notifies, by using the RRC signaling, the terminal of an offset value between the synchronization signal block frequency domain position and a sub-BP corresponding to a least significant bit or a most significant bit in the bitmap, namely, an offset value between the synchronization signal block frequency domain position and a lowest frequency domain position or a highest frequency domain position of the virtual bandwidth. In one embodiment, the offset value may be a particular quantity of PRBs, or may be a particular quantity of sub-BPs, or may be a particular quantity of sub-BP groups. In one embodiment, the base station further needs to notify a position relationship between the reference frequency domain position and the virtual bandwidth. The position relationship includes: the reference frequency domain position is in the virtual bandwidth and the reference frequency domain position is at a low frequency domain position or a high frequency domain position of the virtual bandwidth. For example, in FIG. 3, the reference frequency domain position, namely, the synchronization signal block frequency domain position is in the virtual bandwidth, and is at a position of the sub-BP 5. An offset value between the synchronization signal block frequency domain position and a sub-BP corresponding to the least significant bit in the bitmap is 5, an offset value between the synchronization signal block frequency domain position and a sub-BP corresponding to the most significant bit in the bitmap is 4, and the value of the bitmap is 1111011011. Therefore, sub-BPs occupied by the resource allocated to the terminal include the sub-BP 0, the sub-BP 1, the sub-BP 2, the sub-BP 3, the sub-BP 4, the sub-BP 5, the sub-BP 8, and the sub-BP 9. For another example, in FIG. 4, the reference frequency domain position, namely, the synchronization signal block frequency domain position is at the low frequency domain position of the virtual bandwidth, and the value of the bitmap is 1111011011. Therefore, the sub-BPs occupied by the terminal include the sub-BP 0, the sub-BP 1, the sub-BP 2, the sub-BP 3, the sub-BP 4, the sub-BP 5, the sub-BP 8, and the sub-BP 9. Certainly, the reference frequency domain position may alternatively be at the high frequency domain position of the virtual bandwidth. The terminal determines an operating bandwidth of the terminal based on the offset value between the reference frequency domain position and the lowest frequency domain position, or the offset value between the reference frequency domain position and the highest frequency domain position, or the offset value between the reference frequency domain position and a specified frequency domain position in the virtual bandwidth and a sub-BP allocation status in the virtual bandwidth.

In one embodiment, the base station may further notify the terminal of the specific position of the occupied sub-BP in the virtual bandwidth in a resource allocation manner 1 or a resource allocation manner 2 in the existing LTE. For example, a segment of contiguous bandwidths is allocated to one terminal in the resource allocation manner 2. The segment of the contiguous bandwidths occupies $\log_2(N(N+1)/2)$ bits, where N is a quantity of sub-BPs in the virtual bandwidth.

According to the foregoing method, in a scenario in which the terminal cannot learn of a size of the carrier bandwidth, the base station can indicate an allocated BP to the terminal, and can further indicate a sub-BP in the BP occupied by the terminal.

In addition, when the virtual bandwidth is a public level, the base station further needs to indicate a quantity of unit resource amounts included in a sub-BP at a boundary position of the virtual bandwidth, or a bandwidth size of a boundary sub-BP.

Specifically, if one sub-BP includes p unit resource amounts, a quantity of unit resource amounts included in a sub-BP at the boundary position of the virtual bandwidth may be less than P. The base station indicates, to the terminal by using signaling, the quantity of unit resource amounts included in the sub-BP at the boundary position of the virtual bandwidth. This helps prevent the resource used by the terminal from being beyond the boundary of the virtual bandwidth, and effectively improve accuracy of the resource indication. In one embodiment, the base station may perform the foregoing indication by using $(\log_2 P)$ bits.

Figure 5:
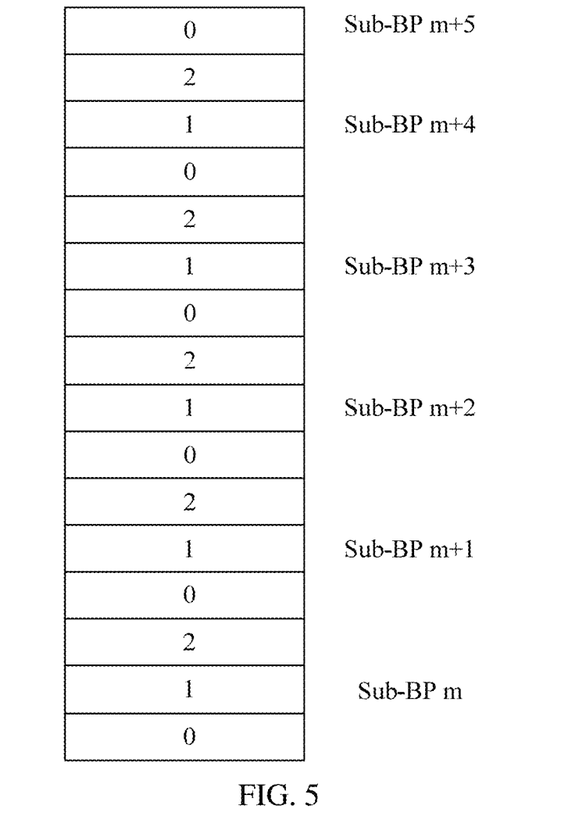
FIG. 5 is a schematic diagram of sub-BP division at a boundary of a virtual bandwidth according to an embodiment of this application.

For example, it is assumed that P=3, a unit resource amount is a PRB, and one sub-BP includes three PRBs. FIG. 5 shows five sub-BPs, namely, a sub-BP m, a sub-BP m+1, . . . and a sub-BP m+5. Each sub-BP includes three PRBs, namely, 0, 1, and 2. The sub-BP (m+5) is located at the boundary position of the virtual bandwidth, and the sub-BP (m+5) includes only one PRB that is less than the quantity 3 of PRBs included in one sub-BP. The base station may perform indication by using (log 2P)=2 bits. 00 may be used to indicate that the sub-BP (m+5) includes three PRBs, 01 may be used to indicate that the sub-BP (m+5) includes one PRB, and 10 may be used to indicate that the sub-BP (m+5) includes two PRBs.

For example, if a bandwidth size of one sub-BP is 3 MHz, and the size of the virtual bandwidth is 100 MHz, one virtual bandwidth includes 34 sub-BPs, and a size of the last one boundary sub-BP is 1 MHz. Indication needs to be performed. The base station may perform the indication by using log 2Q, where Q is the bandwidth size of the sub-BP. Therefore, two bits may be used to indicate a bandwidth size of a boundary sub-BP, 00 indicates that the bandwidth size of the boundary sub-BP is 3 MHz, 01 indicates that the bandwidth size of the boundary sub-BP is 1 MHz, and 10 indicates that the bandwidth size of the boundary sub-BP is 2 MHz.

Figure 6:
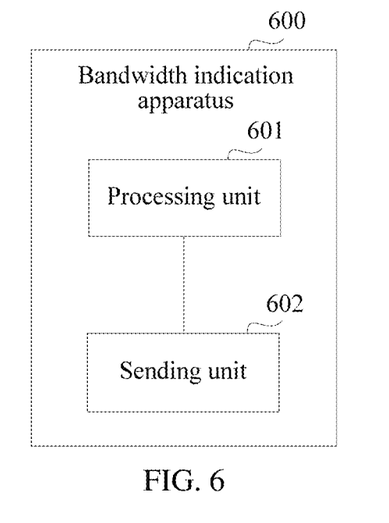
FIG. 6 is a first schematic structural diagram of a bandwidth indication apparatus according to an embodiment of this application.

Based on an inventive concept same as the bandwidth indication method shown in FIG. 2, as shown in FIG. 6, an embodiment of this application further provides a bandwidth indication apparatus 600. The bandwidth indication apparatus 600 is configured to perform the bandwidth indication method shown in FIG. 2. The bandwidth indication apparatus 600 includes:

a processing unit 601, configured to determine a virtual bandwidth allocated to a terminal, where the virtual bandwidth is a part of a carrier bandwidth, and a bandwidth allocated to the terminal falls within the virtual bandwidth; and a sending unit 602, configured to send position information of the virtual bandwidth to the terminal, where the position information is used to indicate a position of the virtual bandwidth.

In one embodiment, the position information includes a relative position of the virtual bandwidth relative to a reference frequency domain position.

In one embodiment, the sending unit 602 is further configured to:

send a first message, where the first message includes a bandwidth set, and the bandwidth set includes at least one bandwidth, or the bandwidth set is predefined; and send a second message, where the second message is used to indicate that one bandwidth in the bandwidth set is a size of the virtual bandwidth.

In one embodiment, a size of the virtual bandwidth is predefined; and there is a correspondence between a carrier frequency and a bandwidth, and the processing unit is configured to determine, based on the correspondence, that a bandwidth corresponding to a used carrier frequency is the size of the virtual bandwidth.

In one embodiment, the relative position includes:

a first offset value between the reference frequency domain position and a lowest frequency domain position of the virtual bandwidth; or a second offset value between the reference frequency domain position and a highest frequency domain position of the virtual bandwidth; or a third offset value between the reference frequency domain position and a specified frequency domain position of the virtual bandwidth.

In one embodiment, the sending unit 602 is further configured to:

send resource indication information, where the resource indication information is used to indicate a frequency domain position of a sub-bandwidth occupied by the terminal in the virtual bandwidth; or the resource indication information is used to indicate a frequency domain position of a sub-bandwidth group occupied by the terminal in the virtual bandwidth, the sub-bandwidth group includes n sub-bandwidths, n≥2, and n is a positive integer.

In one embodiment, the reference frequency domain position is a synchronization signal block frequency domain position, or a public bandwidth frequency domain position, or a direct current carrier frequency domain position.

Figure 7:
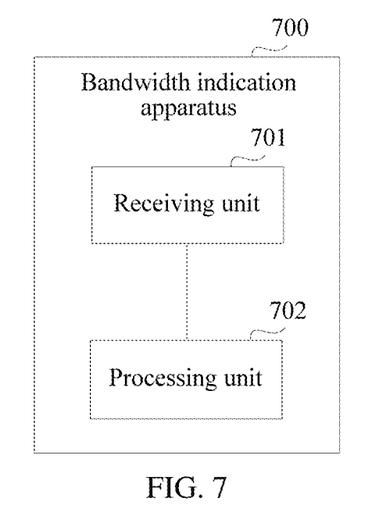
FIG. 7 is a second schematic structural diagram of a bandwidth indication apparatus according to an embodiment of this application.

Based on an inventive concept same as the bandwidth indication method shown in FIG. 2, as shown in FIG. 7, an embodiment of this application further provides a bandwidth indication apparatus 700. The bandwidth indication apparatus 700 is configured to perform the bandwidth indication method shown in FIG. 2. The bandwidth indication apparatus 700 includes:

a receiving unit 701, configured to receive position information of a virtual bandwidth, where the virtual bandwidth is a part of a carrier bandwidth, a bandwidth allocated by a base station to the apparatus falls within the virtual bandwidth, and the position information is used to indicate a position of the virtual bandwidth; and a processing unit 702, configured to determine the position of the virtual bandwidth based on the position information received by the receiving unit 701.

In one embodiment, the position information includes a relative position of the virtual bandwidth relative to a reference frequency domain position.

In one embodiment, the receiving unit 701 is further configured to:

receive a first message, where the first message includes a bandwidth set, and the bandwidth set includes at least one bandwidth, or the bandwidth set is predefined; and receive a second message, where the second message is used to indicate that one bandwidth in the bandwidth set is a size of the virtual bandwidth.

In one embodiment, a size of the virtual bandwidth is predefined; and there is a correspondence between a carrier frequency and a bandwidth, and the terminal determines, based on the correspondence, that a bandwidth corresponding to a used carrier frequency is the size of the virtual bandwidth.

In one embodiment, the relative position includes:

a first offset value between the reference frequency domain position and a lowest frequency domain position of the virtual bandwidth; or a second offset value between the reference frequency domain position and a highest frequency domain position of the virtual bandwidth; or a third offset value between the reference frequency domain position and a specified frequency domain position of the virtual bandwidth.

In one embodiment, the receiving unit 701 is further configured to:

receive resource indication information, and the processing unit 702 is further configured to: determine, according to the resource indication information, a frequency domain position of a sub-bandwidth occupied by the terminal in the virtual bandwidth; or determine, according to the resource indication information, a frequency domain position of a sub-bandwidth group occupied by the terminal in the virtual bandwidth, where the sub-bandwidth group includes n sub-bandwidths, n≥2, and n is a positive integer.

In one embodiment, the reference frequency domain position is a synchronization signal block frequency domain position, or a public bandwidth frequency domain position, or a direct current carrier frequency domain position.

Figure 8:
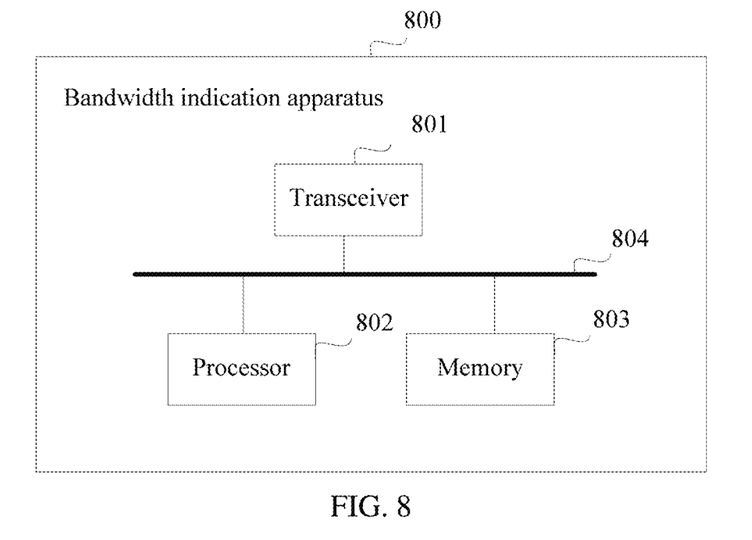
FIG. 8 is a third schematic structural diagram of a bandwidth indication apparatus according to an embodiment of this application.

Based on an inventive concept same as the bandwidth indication method shown in FIG. 2, as shown in FIG. 8, an embodiment of this application further provides a bandwidth indication apparatus 800. The bandwidth indication apparatus 800 may be configured to perform the bandwidth indication method shown in FIG. 2. The bandwidth indication apparatus 800 includes a transceiver 801, a processor 802, a memory 803, and a bus 804. The processor 802 is connected to the memory 803 by using the bus 804. The processor 802 is configured to execute code in the memory 803. When the code is executed, the execution enables the processor 802 to perform the bandwidth indication method shown in FIG. 2.

The processor 802 may be a central processing unit (CPU), a network processor (NP), or a combination of a CPU and an NP.

The processor 802 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 803 may include a volatile memory, such as a random-access memory (RAM). Alternatively, the memory 803 may include a non-volatile memory, such as a flash memory, a hard disk drive (HDD), or a solid-state drive (SSD). Alternatively, the memory 803 may include a combination of the foregoing types of memories.

Figure 9:
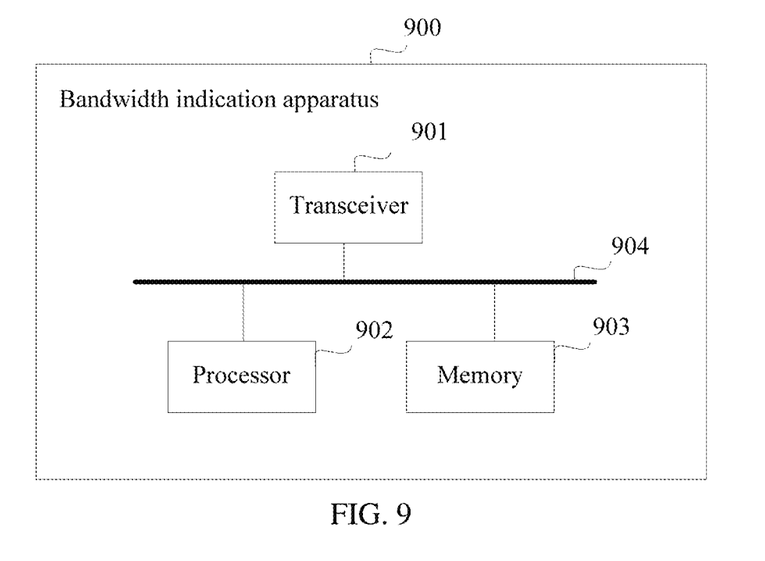
FIG. 9 is a fourth schematic structural diagram of a bandwidth indication apparatus according to an embodiment of this application.

Based on an inventive concept same as the bandwidth indication method shown in FIG. 2, as shown in FIG. 9, an embodiment of this application further provides a bandwidth indication apparatus 900. The bandwidth indication apparatus 900 may be configured to perform the bandwidth indication method shown in FIG. 2. The bandwidth indication apparatus 900 includes a transceiver 901, a processor 902, a memory 903, and a bus 904. The processor 902 is connected to the memory 903 by using the bus 904. The processor 902 is configured to execute code in the memory 903. When the code is executed, the execution enables the processor 902 to perform the bandwidth indication method shown in FIG. 2.

The processor 902 may be a CPU, a NP, or a combination of a CPU and an NP.

The processor 902 may further include a hardware chip. The foregoing hardware chip may be an ASIC, a PLD, or a combination thereof. The PLD may be a CPLD, a FPGA, a GAL, or any combination thereof.

The memory 903 may include a volatile memory, such as a RAM. Alternatively, the memory 903 may include a non-volatile memory, such as a flash memory, a HDD, or a SSD. Alternatively, the memory 903 may include a combination of the foregoing types of memories.

An embodiment of this application provides a computer storage medium, configured to store a computer program. The computer program includes an instruction used to perform the bandwidth indication method shown in FIG. 2.

An embodiment of this application provides a computer program product including an instruction. When the computer program product is run on a computer, the computer is enabled to perform the bandwidth indication method shown in FIG. 2.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations are performed on the computer or the another programmable device, thereby generating computer-implemented processing. Therefore, the instructions executed on the computer or another programmable device provide operations for implementing a specific function in one or more processes in the flowcharts and/or in one or more blocks in the block diagrams.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A bandwidth indication method, comprising:
   determining, by a base station, a virtual bandwidth allocated to a terminal, wherein the virtual bandwidth is a segment of contiguous bandwidths pre-divided from a carrier bandwidth, and a bandwidth allocated to the terminal falls within the virtual bandwidth; and
   sending, by the base station, position information of the virtual bandwidth to the terminal, wherein the position information is used to indicate a position of the virtual bandwidth, wherein the position information comprises a relative position of the virtual bandwidth relative to a reference frequency domain position fixed in the carrier bandwidth, and the relative position of the virtual bandwidth includes an offset value between the reference frequency domain position and a specified frequency domain position of the virtual bandwidth.

2. The method according to claim 1, wherein the method further comprises:
   sending, by the base station, a first message, wherein the first message comprises a bandwidth set, and the bandwidth set comprises at least one bandwidth, or the bandwidth set is predefined; and sending, by the base station, a second message, wherein the second message is used to indicate that one bandwidth in the bandwidth set is a size of the virtual bandwidth.

3. The method according to claim 1, wherein a size of the virtual bandwidth is predefined; and there is a correspondence between a carrier frequency and a bandwidth, and the base station determines, based on the correspondence, that a bandwidth corresponding to a used carrier frequency is the size of the virtual bandwidth.

4. The method according to claim 1, wherein the method further comprises:

sending, by the base station, resource indication information, wherein the resource indication information is used to indicate a first frequency domain position of a sub-bandwidth occupied by the terminal in the virtual bandwidth; or the resource indication information is used to indicate a second frequency domain position of a sub-bandwidth group occupied by the terminal in the virtual bandwidth, the sub-bandwidth group comprises n sub-bandwidths, n≥2, and n is a positive integer.

5. The method according to claim 1, wherein the reference frequency domain position is a synchronization signal block frequency domain position, or a public bandwidth frequency domain position, or a direct current carrier frequency domain position.

6. A bandwidth indication method, comprising:

receiving, by a terminal, position information of a virtual bandwidth, wherein the virtual bandwidth is a segment of contiguous bandwidths pre-divided from a carrier bandwidth, a bandwidth allocated by a base station to the terminal falls within the virtual bandwidth, and the position information is used to indicate a position of the virtual bandwidth; and determining, by the terminal, the position of the virtual bandwidth based on the position information, wherein the position information comprises a relative position of the virtual bandwidth relative to a reference frequency domain position fixed in the carrier bandwidth, and the relative position of the virtual bandwidth includes an offset value between the reference frequency domain position and a specified frequency domain position of the virtual bandwidth.

7. The method according to claim 6, wherein the method further comprises:

receiving, by the terminal, a first message, wherein the first message comprises a bandwidth set, and the bandwidth set comprises at least one bandwidth, or the bandwidth set is predefined; and receiving, by the terminal, a second message, wherein the second message is used to indicate that one bandwidth in the bandwidth set is a size of the virtual bandwidth.

8. The method according to claim 6, wherein a size of the virtual bandwidth is predefined; and there is a correspondence between a carrier frequency and a bandwidth, and the terminal determines, based on the correspondence, that a bandwidth corresponding to a used carrier frequency is the size of the virtual bandwidth.

9. The method according to claim 6, wherein the method further comprises:

receiving, by the terminal, resource indication information; and determining, by the terminal according to the resource indication information, a first frequency domain position of a sub-bandwidth occupied by the terminal in the virtual bandwidth, or determining, by the terminal according to the resource indication information, a second frequency domain position of a sub-bandwidth group occupied by the terminal in the virtual bandwidth, wherein the sub-bandwidth group comprises n sub-bandwidths, n≥2, and n is a positive integer.

10. A bandwidth indication apparatus, comprising:

a memory configured to store a program; and a processor configured to execute the program stored in the memory, wherein when the program is executed the processor performs a method including:

receiving position information of a virtual bandwidth, wherein the virtual bandwidth is a segment of contiguous bandwidths pre-divided from a carrier bandwidth, a bandwidth allocated by a base station to the apparatus falls within the virtual bandwidth, and the position information is used to indicate a position of the virtual bandwidth; and determining the position of the virtual bandwidth based on the position information, wherein the position information comprises a relative position of the virtual bandwidth relative to a reference frequency domain position fixed in the carrier bandwidth, and the relative position of the virtual bandwidth includes an offset value between the reference frequency domain position and a specified frequency domain position of the virtual bandwidth.

11. The apparatus according to claim 10, wherein the processor is further configured to:

receive a first message, wherein the first message comprises a bandwidth set, and the bandwidth set comprises at least one bandwidth, or the bandwidth set is predefined; and receive a second message, wherein the second message is used to indicate that one bandwidth in the bandwidth set is a size of the virtual bandwidth.

12. The apparatus according to claim 10, wherein a size of the virtual bandwidth is predefined; and there is a correspondence between a carrier frequency and a bandwidth, and a terminal determines, based on the correspondence, that a bandwidth corresponding to a used carrier frequency is the size of the virtual bandwidth.

13. The apparatus according to claim 10, wherein the processor is further configured to:

receive resource indication information, and the processor is further configured to: determine, according to the resource indication information, a first frequency domain position of a sub-bandwidth occupied by a terminal in the virtual bandwidth; or determine, according to the resource indication information, a second frequency domain position of a sub-bandwidth group occupied by the terminal in the virtual bandwidth, wherein the sub-bandwidth group comprises n sub-bandwidths, n≥2, and n is a positive integer.

14. The apparatus according to claim 10, wherein the reference frequency domain position is a synchronization signal block frequency domain position, or a public bandwidth frequency domain position, or a direct current carrier frequency domain position.

* * * * *